(12) United States Patent
Anderson

(10) Patent No.: US 12,268,203 B2
(45) Date of Patent: *Apr. 8, 2025

(54) SYSTEM AND METHOD FOR TREATING UNDERWATER INVASIVE SPECIES

(71) Applicant: Deloren E. Anderson, Crosby, MN (US)

(72) Inventor: Deloren E. Anderson, Crosby, MN (US)

(73) Assignee: Deloren E. Anderson, Crosby, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,593

(22) Filed: Oct. 6, 2023

(65) Prior Publication Data

US 2024/0107993 A1 Apr. 4, 2024

Related U.S. Application Data

(63) Continuation of application No. 16/723,144, filed on Dec. 20, 2019, now Pat. No. 11,825,828.

(60) Provisional application No. 62/783,462, filed on Dec. 21, 2018.

(51) Int. Cl.
*A01M 19/00* (2006.01)
(52) U.S. Cl.
CPC .................. *A01M 19/00* (2013.01)
(58) Field of Classification Search
CPC .......... B63B 59/04; A01M 19/00; C02F 1/00; C02F 1/30
See application file for complete search history.

(56) References Cited

U.S. PATENT DOCUMENTS

| 5,078,971 | A | 1/1992 | Matuda et al. |
| 11,825,828 | B2 | 11/2023 | Anderson |
| 2006/0124442 | A1* | 6/2006 | Valpey ...................... C07C 1/00 204/157.15 |
| 2014/0286843 | A1 | 9/2014 | Grossman et al. |
| 2016/0083270 | A1 | 3/2016 | Charbonneau et al. |
| 2020/0196589 | A1 | 6/2020 | Anderson |

OTHER PUBLICATIONS

"U.S. Appl. No. 16/723,144, Restriction Requirement mailed Sep. 8, 2021", 7 pgs.
"U.S. Appl. No. 16/723,144, Response filed Nov. 8, 2021 to Restriction Requirement mailed Sep. 8, 2021", 5 pgs.
"U.S. Appl. No. 16/723,144, Examiner Interview Summary mailed Feb. 7, 2022", 2 pgs.
"U.S. Appl. No. 16/723,144, Non Final Office Action mailed Mar. 18, 2022", 10 pgs.
"U.S. Appl. No. 16/723,144, Response filed Sep. 16, 2022 to Non Final Office Action mailed Mar. 18, 2022", 7 pgs.

(Continued)

*Primary Examiner* — Joshua J Michener
*Assistant Examiner* — Henry Hooper Mudd
(74) *Attorney, Agent, or Firm* — Schwegman Lundberg & Woessner, P.A.

(57) ABSTRACT

An underwater device for subduing underwater invasive species includes a translucent or transparent fixture having a TiO2 coating on at least one side of the fixture and a light source positioned to expose the coating with light having sufficient intensity and selected range of frequencies to activate the photocatalytic TiO2 coated fixture.

5 Claims, 17 Drawing Sheets

(56) References Cited

OTHER PUBLICATIONS

"U.S. Appl. No. 16/723,144, Final Office Action mailed Nov. 29, 2022", 16 pgs.
"U.S. Appl. No. 16/723,144, Response filed Mar. 30, 2023 to Final Office Action mailed Nov. 29, 2022", 8 pgs.
"U.S. Appl. No. 16/723,144, Advisory Action mailed Apr. 11, 2023", 3 pgs.
"U.S. Appl. No. 16/723,144, Notice of Allowance mailed Jul. 6, 2023", 7 pgs.

* cited by examiner

SYSTEM AND METHOD FOR TREATING UNDERWATER INVASIVE SPECIES

RELATED APPLICATION

This application is a continuation of U.S. application Ser. No. 16/723,144, filed Dec. 20, 2019, which claims priority to U.S. Provisional Application Ser. No. 62/783,462 (entitled System and Method for Treating Underwater Invasive Species), filed Dec. 21, 2018, each of which is incorporated herein by reference.

BACKGROUND

Light emitting diodes have long been used individually or grouped together as background or indicating lights in electronic devices. Because of the efficient light production, durability, long life, and small size, light emitting diodes were ideal for electronic applications. Light emitting diodes are increasingly prevalent in a variety of lighting functions, including flashlights and various automotive uses.

Nano Photocatalytic Titanium Dioxide (TiO2) has been used since the 1960s in Japan and Taiwan for pollution control in major cities. It was found that coating buildings with TiO2 resulted in sunshine activating the TiO2 to capture pollution from the air, with rainwater washing the captured pollution off the buildings.

Furnace manufacturers have used a honeycomb structure coated unit with TiO2, activated with ultraviolet light, and air pumped past the structure, cleaned volatile organic compounds (VOCs) out of the air in indoor applications.

Hospitals have similar portable units activated by ultraviolet light to clean the air in rooms. NASA has tested and uses the TiO2 coating on the outside of space ships to self-clean itself during reentry into the atmosphere. TiO2 coatings have been used on inside surfaces of space capsules and space stations to clean air for astronauts.

DETAILED DESCRIPTION

Figure 1:
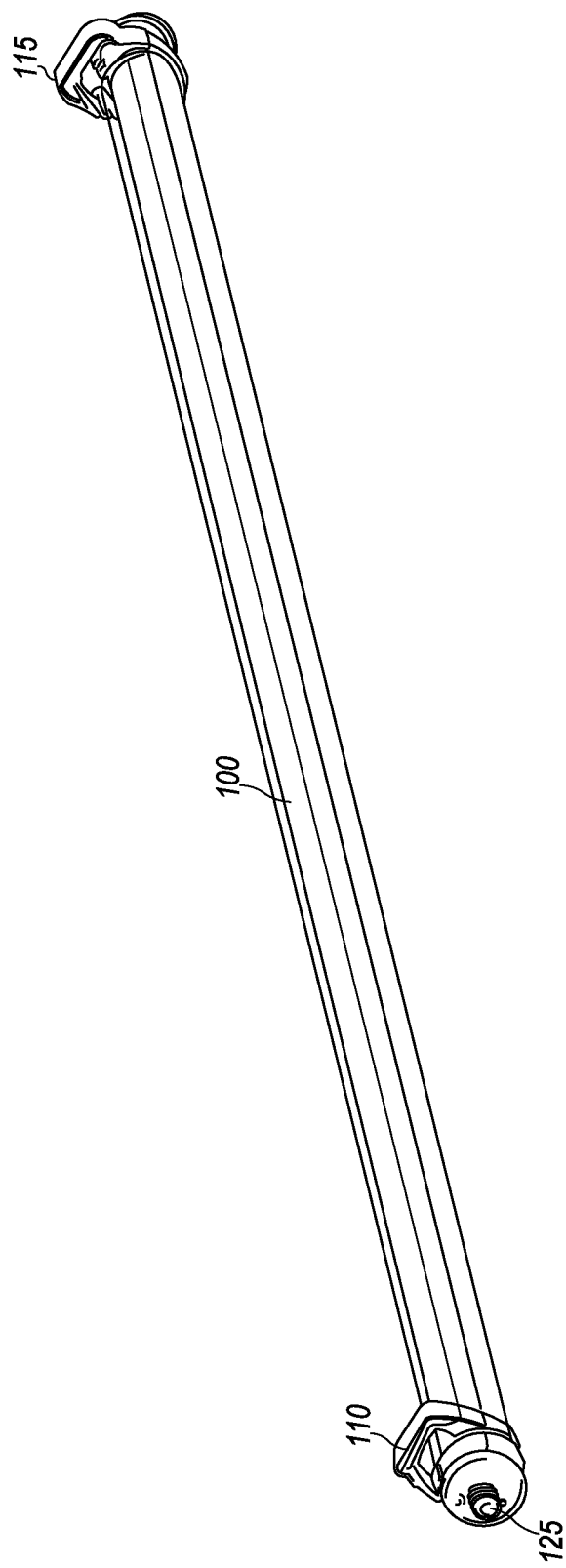
FIG. 1 is a perspective block diagram view of a two-inch luminaire having clips according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

In various embodiments of the present inventive subject matter, involves the application of TiO2 on fixtures, such as LED bulbs, tubes, diffusers, boats, ships, docks, posts, piers, anchors, lines, and other structures and equipment that may be exposed to underwater invasive species. Such fixtures when placed in freshwater lakes, seas, oceans, and containers having water may be used to suppress, reduce, or eliminate certain invasive species. The TiO2 is photocatalytic and is activated by high intensity light of specific frequencies, particularly in the ultra violet (UV) range, but also to some extent in the visible range of light.

Recent testing by the inventor has shown that the efficiency of activating TiO2 with visual light of an LED is three times more effective at suppressing certain invasive species than any method expected. That is because of the close relationship of the LED to the coating surface the TiO2 was effective in providing a higher intensity light of relevant frequencies at the surfaces having TiO2 coatings. Note that while LED light sources were tested, other light sources, such as natural sunlight, laser, incandescent, and other sources may be used. The term LED may be used to describe multiple embodiments, but it should be understood that other light sources may be used in such embodiments.

The application in all-natural underwater environments that contain zebra mussel invasive species by the inventor, has revealed that the coating material in combination with high intensity light exposure of the coating material will destroy zebra mussel larva, suppressing the population of the invasive species.

The zebra mussels are phototropic invertebrates, because of feeding their development off phytoplankton which is an active product of nature growing in sunlight, the zebra mussels and positive phototaxy attracted towards the light in the first half of their life cycle as a larvae, which appears to be attracted toward high intensity light, such as light in the visible range of wavelengths greater than wavelengths of 400 nm.

The $TiO_2$ coating affective to 10-micron depth or more of any organic molecule that contacts the coating while exposed to suitable intensity and frequency light. The zebra mussel egg is 1 micron in diameter and is externally fertilized. The 1-micron eggs proceed through many types of filters, turn into larva, and eventually into shells that attach to structures and interfere with equipment.

The larvae include cilia that are used to paddle the larvae toward light. The second half of the life—shells—hide in dark to protect themselves from predators. Larvae feed on plankton and may be attracted to different frequencies of light that are indicative of zooplankton. Plankton eaten by larvae is green and occurs in shallow water. Spotlights that project a narrow high intensity light may be used to attract larvae over longer distances.

In water, the $TiO_2$ coating on underwater structures, when exposed to suitable light produce OH from the water molecule —O2 and OH. O2 is an air bubble. The larvae when exposed, dry-up and burst. Coated fixtures may be put near structures to provide protection. The structure to be protected may also be coated with light sources positioned to expose the coated surfaces.

The female zebra mussel may lay 30 to 40 thousand eggs at a time, and over 1 million eggs per year. Contact with materials having $TiO_2$ coating exposed to suitable intensity light appears to be extremely effective at destroying larva hatching from the eggs.

With general applications of LED fixtures (light sources positioned to expose surfaces of structures coated with $TiO_2$) in Zebra mussel infested waters it is only a matter of time that an infestation can be suppressed and potentially stopped. At a minimum, structures having surfaces coated with $TiO_2$ and receiving suitable light to activate the $TiO_2$ appear to be protected from infestations, along with areas proximate such coated structures.

Various structures that may be coated with $TiO_2$, referred to as fixtures, and corresponding light source components include:
1. 2-inch submersible structure, such as a tube with a 360-degree array of fins.
2. 8-inch array of support legs around the tube to keep off the bottom in all active wave action
3. Tube containing inside triangle of aluminum heat sink
4. Tube containing inside of 3 strips of LED chips, emitting light in all direction at the same time.
5. Tube end caps corrosion resistant and rubber sealed to the tube, IP 68 waterproof to protect the LED in operation.
6. LED luminaire 12, 24 volt or any AC or DC voltage applicable to the number of luminaries, on the system
7. Adapter, of the necessary voltage and amperage to run the desired luminaire.
8. Luminaire is clear, opaque, or transparent in any form.
9. Connected to a power source by a cord or other mechanism.
10. Luminaria may have more than 1 pigtail electric connection to connect more than 1 luminaire to the power adapter.
11. Lumiere may be any size or shape,
12. Luminaire may be powered by AC and or DC current.

Dimensions associated with the above structures and light source components may vary, and actual dimensions expressed above are just examples.

Example structures are now described and shown in various figures. The structures may incorporate LEDs or may be used proximate any type of light source that activates $TiO_2$ that is used to coat the structures. Many of the structures include large coated surface areas that may be placed underwater proximate the light source. The light source may comprise LEDs that may be located underwater with or near the coated surfaces, or even outside the water if of high enough intensity to activate the $TiO_2$ coating. Sunlight, laser, or other light source or sources may be used to activate the $TiO_2$. High intensity LEDS that are very close to the coated surfaces cause higher reaction rates with the $TiO_2$ and appear to be more effective in eliminating zebra mussel larvae.

FIG. 1 is a perspective block diagram view of a two-inch luminaire 100 having clips 110, 115 for supporting the luminaire in a desired position. The luminaire may be referred to as fixture and may be a clear poly tube 120 with one or more LEDs inside (not shown) with electrical connectors 125 on at least one end of the tube 120 for coupling to a power source. The luminaire may also be translucent and may include or be formed as a diffuser.

The inside and outside surfaces of the luminaire may be coated, and the ends of the luminaire may have openings to provide power to the LEDs by sealing electrical conductors, connectors 125, in the openings. Zebra mussel larvae are attracted to the light and congregate proximate to the coated surfaces that are exposed to the light.

Structures, such as boats, docks, and other structures that are in the water with zebra mussels may exhibit fewer adult zebra mussel attachments over time if appropriately protected by one or more luminaires. The structures to be protected may also be coated with $TiO_2$ and exposed to high intensity light that includes appropriate UV wavelengths to activate the $TiO_2$ coatings. Similarly, other coated fixtures may be placed near structures to be protected with LED light projected onto such coated fixtures and optionally coated structures by a light source or sources, such as LEDs positioned nearby. In some embodiment, the light from light sources may be projected onto the structures by spotlights emitting UV light. Reflective surfaces may also be employed to reflect light from sources, such as sunlight, onto the $TiO_2$ coated surfaces of fixtures and/or structures.

Figure 2:
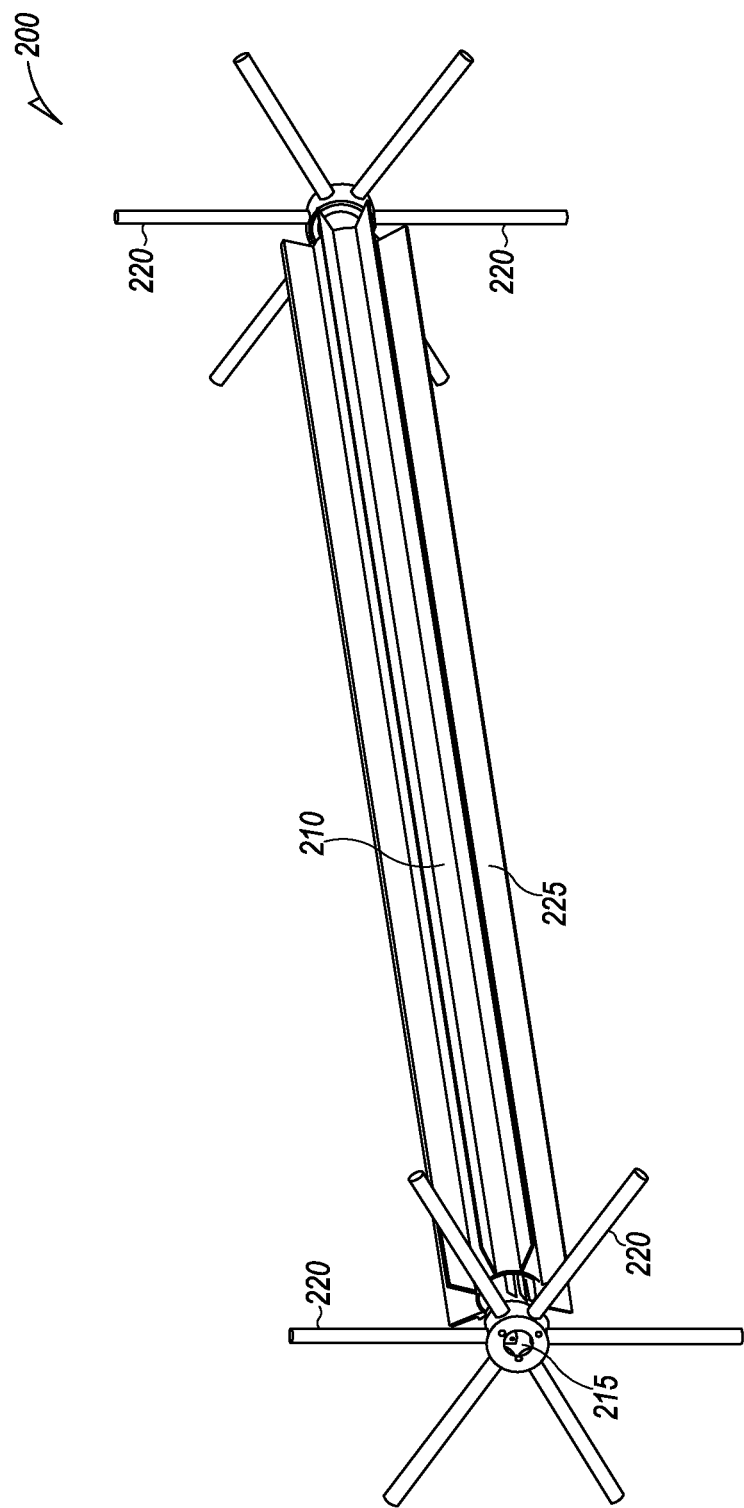
FIG. 2 is a perspective block diagram view of a completed fixture that includes a luminaire according to an example embodiment.

FIG. 2 is a perspective block diagram view of a completed fixture 200 that includes a luminaire. Fixture 200 has a clear tube main body 210 with internal LEDs and end caps 215 with multiple rods 220 or legs coupled to each end of the body 210. The legs 220 extend from the end caps 215 radially orthogonal to the length of the luminaire body 210, spacing the body 210 from the bottom of a body of zebra mussel infected water. Six equally spaced legs 220 are shown. Fewer or more legs, or even a disk or other polygon shaped solid or mesh structure may be used in further embodiments to space the fixture 200 from a bottom.

The tube body 210 may also have one or more radially extending fins 225 running the length of the body 210, which may also be coated with $TiO_2$, creating a much larger surface area for $TiO_2$ activation, as the tube may be transparent, translucent, or clear.

Figure 3:
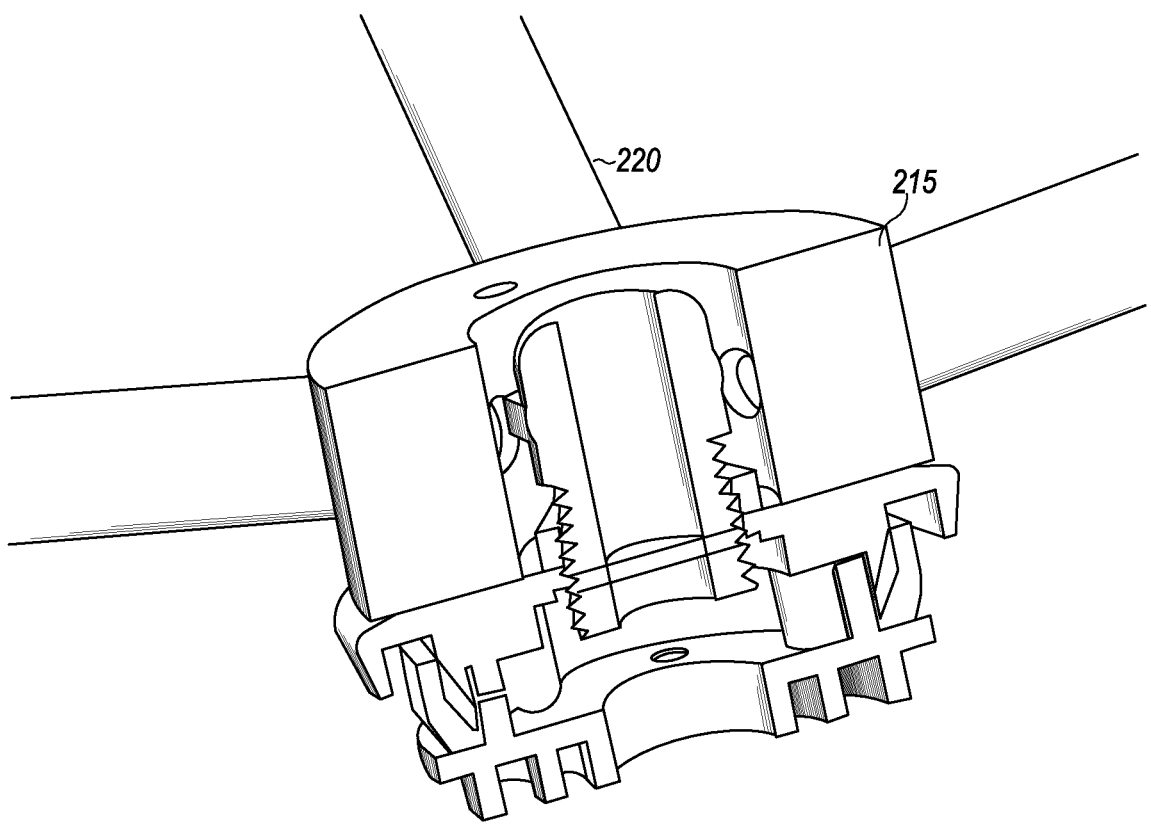
FIG. 3 is a perspective cross section view of a leg assembly showing a cut-away portion of an end cap with legs according to an example embodiment.

FIG. 3 is a perspective cross section view of a leg assembly 300 showing a cut-away portion of an end cap 215 with three legs 220 attached. The end cap 215 maybe coupled to the body/tube via glue, welding, compression fit, or otherwise retentively attached.

Figure 4:
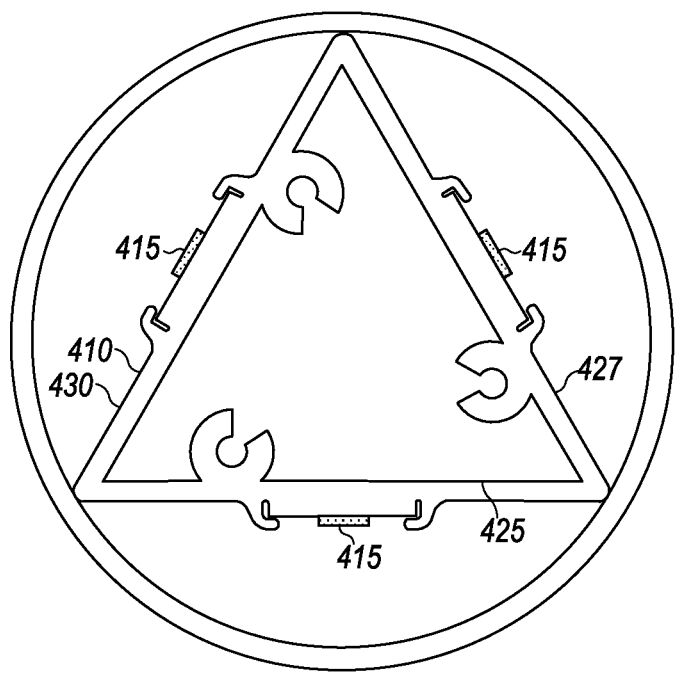
FIG. 4 is a cross section of a tube having a triangular internal support supporting an LED assembly according to an example embodiment.

FIG. 4 is a cross section of a tube 400 having a triangular internal support 410 supporting an LED assembly 415 on sides or faces 420, 425, and 430 of the triangle support 410 to illuminate an interior of the tube 400 from three directions corresponding to each side of the triangle support. The triangle support may run along the length of or a portion of the length of the tube 400 in various embodiments. The LEDs of the LED assembly 415 are illustrated as being positioned near a middle of the triangle support sides, directing light outward toward the interior of the tube 400.

Figure 5:
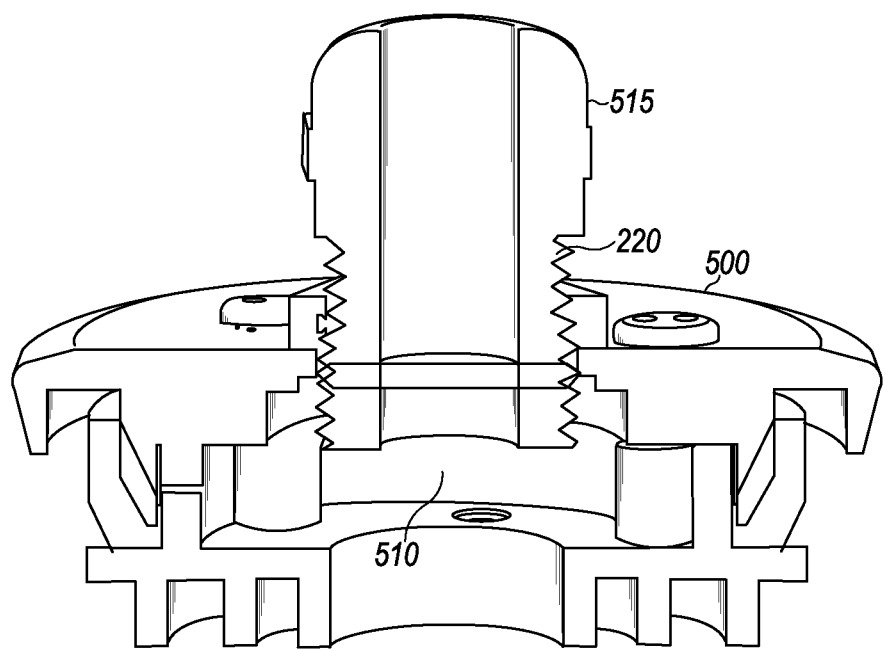
FIG. 5 is a cross section of an endcap according to an example embodiment.

FIG. 5 is a cross section of an endcap 500. The end cap 500 has an opening 510 therethrough for feeding electrical power cords into the an inside of the luminaire to couple to and power at least one light source within the luminaire. An electrical conduit connector is illustrated at 515 coupled by matting threaded portions 520 in one embodiment. The light attracts larvae to close proximity to the exposed coated surfaces to enhance larvae elimination.

Figure 6:
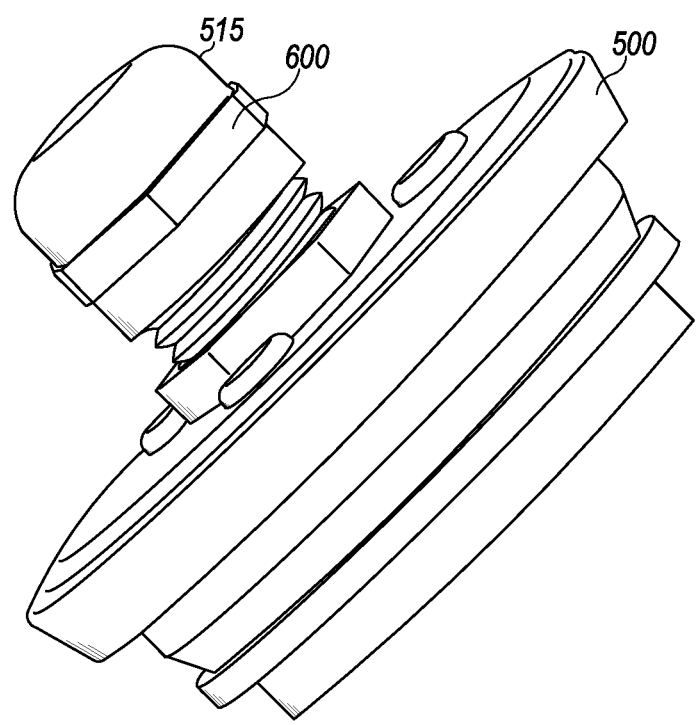
FIG. 6 is a perspective view of the endcap illustrating a conduit connector according to an example embodiment.

FIG. 6 is a perspective view of the endcap 500, illustrating the conduit connector 515. Endcap 500 in one embodiment is for a two-inch diameter tube/body. The conduit connector 515 has a hex nut feature 600 to facilitate coupling to the body/tube.

Figure 7:
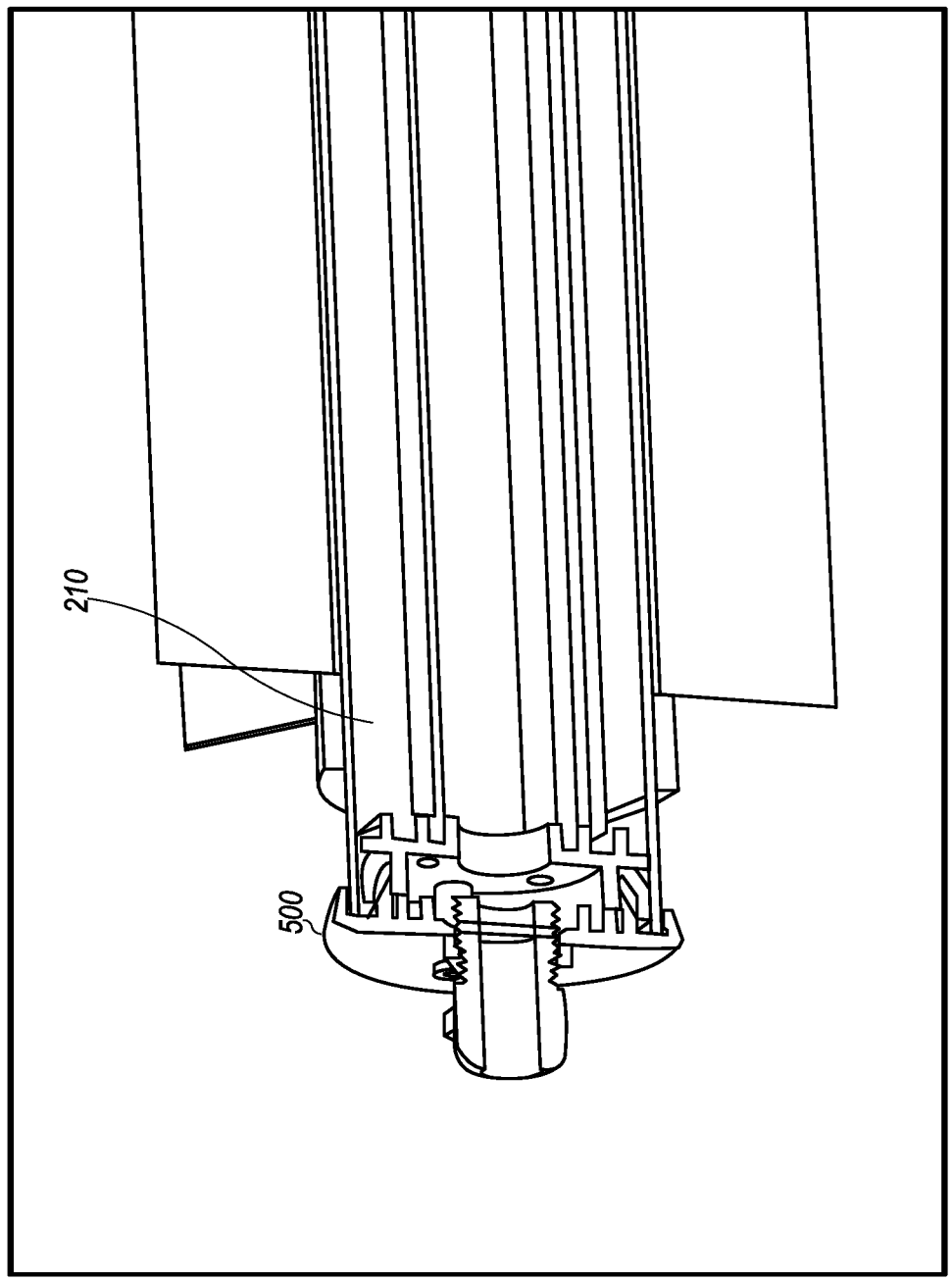
FIG. 7 is a partial cut-away view of the endcap coupled to one end of a tube according to an example embodiment.

FIG. 7 is a partial cut-away view of the endcap 500 coupled to one end of the tube 210 first shown in FIG. 2. In one embodiment, an endcap coupled to a fin tube end, also referred to as a sleeve: The endcap includes an opening for an electrical power cord.

Figure 8:
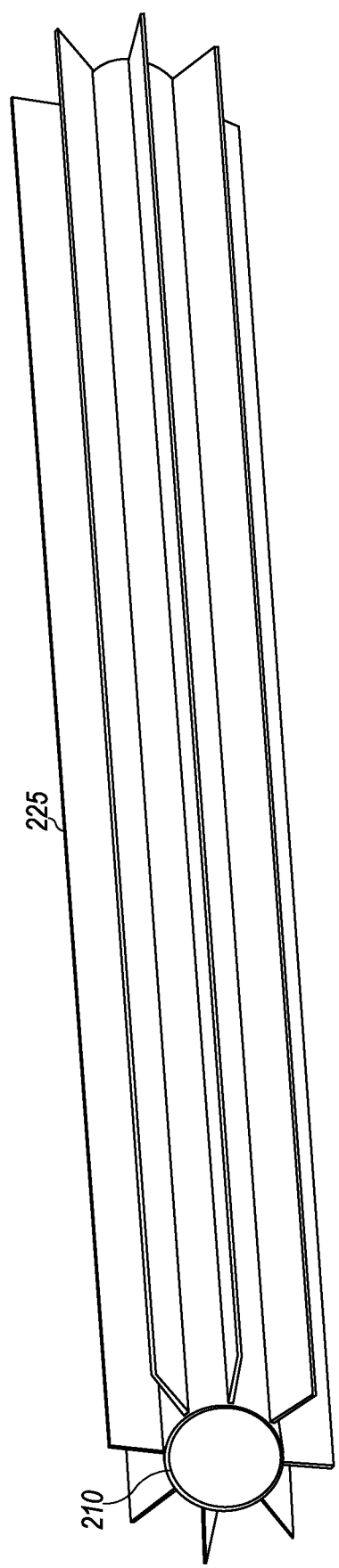
FIG. 8 shows a perspective view of tube with multiple fins according to an example embodiment.

FIG. 8 shows a perspective view of tube 210 with multiple fins 225. Note that all of the surfaces may be coated with TiO2. The fins 225 may be illuminated via the light emitted from lights positioned within the tube, as the tube is transparent or translucent, or may also be illuminated by ambient light or externally positioned light sources, such as LEDs, laser light, or any other source of UV light. In various embodiments, photocatalytic titanium dioxide (TiO2), when exposed to UV or visual light, will act as a catalyst to react with water to create byproducts that appear to harm larvae. UV light in 10-400 nm wavelength range may be used in various embodiments, and emitted by different light sources, including sunlight, LEDs, and lasers. Note that other wavelength light will also work to varying degrees, such as visible light having a wavelength greater than 400 nm. Different light fixtures may be utilized for the light sources, including spotlight and other high intensity light fixtures.

Figure 9:
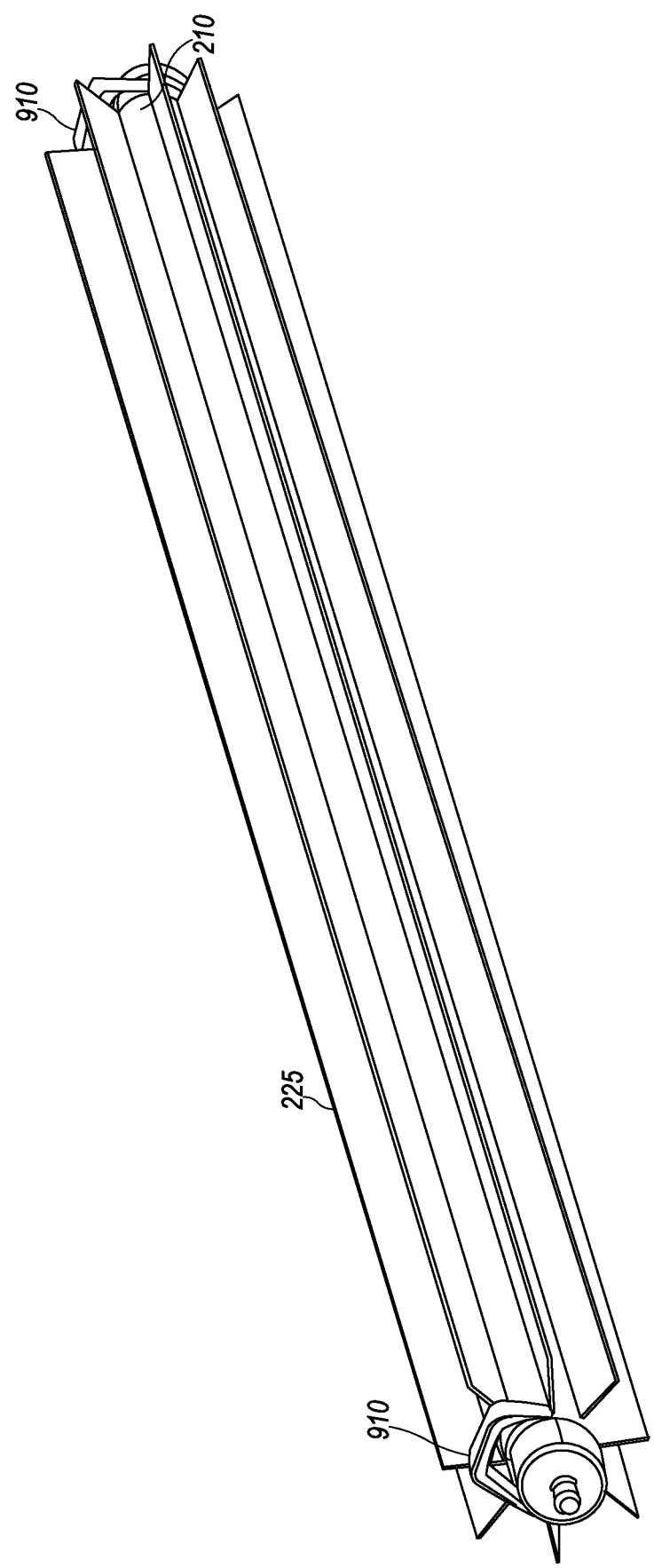
FIG. 9 is a perspective view of the tube with multiple fins supported by attachment clips according to an example embodiment.

FIG. 9 is a perspective view of the tube 210 with multiple fins 225 supported by attachment clips 910. The clips may be used to support the tube 210 comprising a fixture in a position close to light emitted from a light source and near a structure to be protected.

Figure 10:
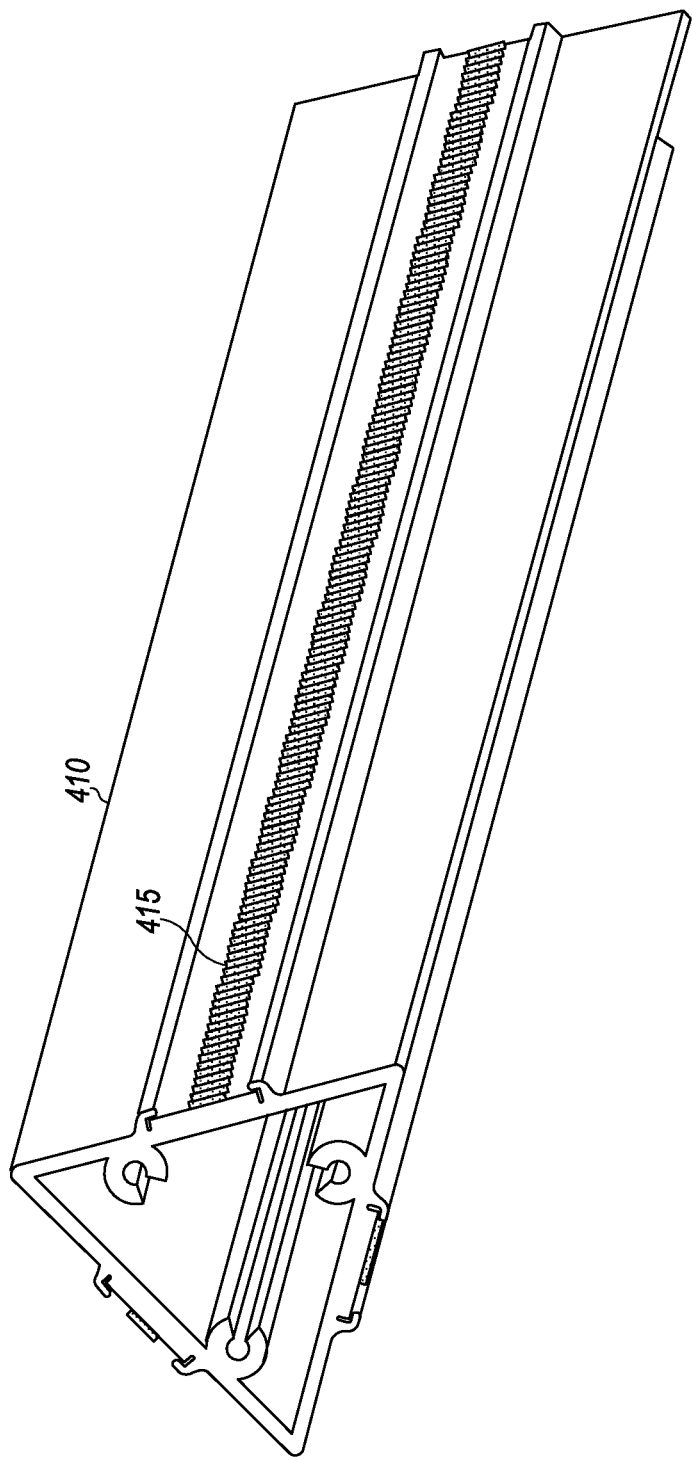
FIG. 10 is a perspective view of triangular internal support having LED assemblies for use inside of a TiO2 coated tube according to an example embodiment.

FIG. 10 is a perspective view of triangular internal support 410 having LED assemblies 415 for use inside of a TiO2 coated tube. In one embodiment, the triangular support 410 may double as a heat sink. The support 410 is illustrated with an elongated LED strip running lengthwise on each face of the triangle support. The LED may run the entire length of each face, or a shorter length if desired. Any configuration of LED lights may be used. The entire surface of a face may be covered with LED lights in some embodiments to provide even high volumes and intensity of light incident on TiO2 coated surfaces.

Figure 11:
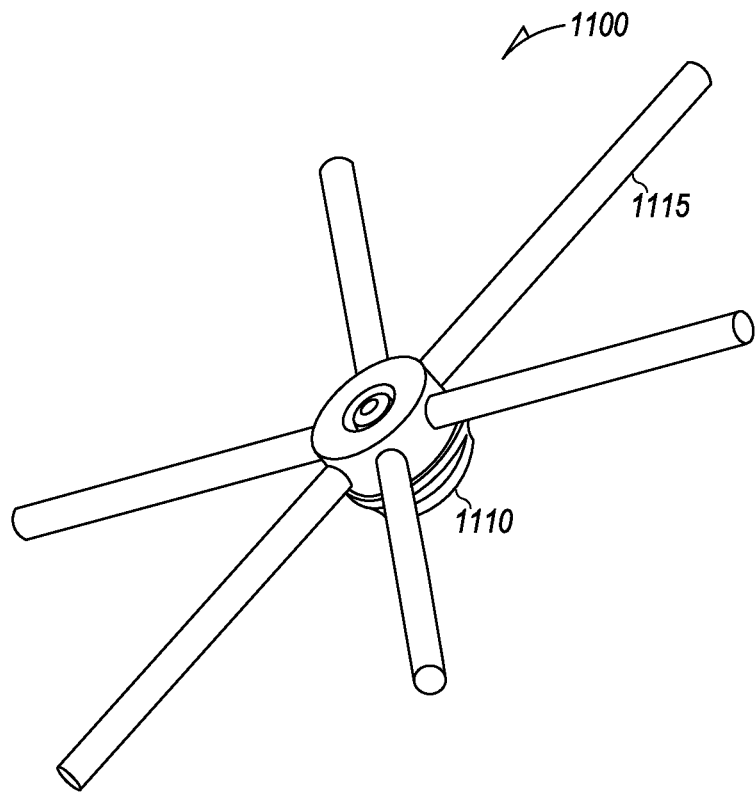
FIG. 11 is a perspective view of a leg assembly having a central hub/end cap with legs according to an example embodiment.

FIG. 11 is a perspective view of a leg assembly 1100 having a central hub/end cap 1110 with six legs 1115 extending like spokes in a plane extending from and supported by the central hub 1110. The hub 1110 has an opening to facilitate provision of power to light sources with the inside of the tube it may be coupled to.

Figure 12:
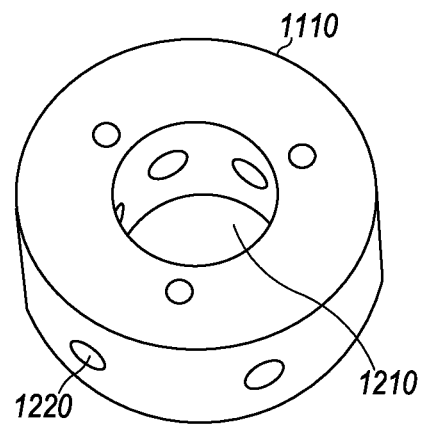
FIG. 12 is a perspective view of central hub comprising a leg mounting ring shaped central hub according to an example embodiment.

FIG. 12 is a perspective view of central hub 1110 comprising a leg mounting ring shaped central hub. The central hub 1110 has an opening 1210 to allow access to a tube it may be coupled to. Radially extending openings 1220 are provided to secure the legs shown in FIG. 11.

Figure 13:
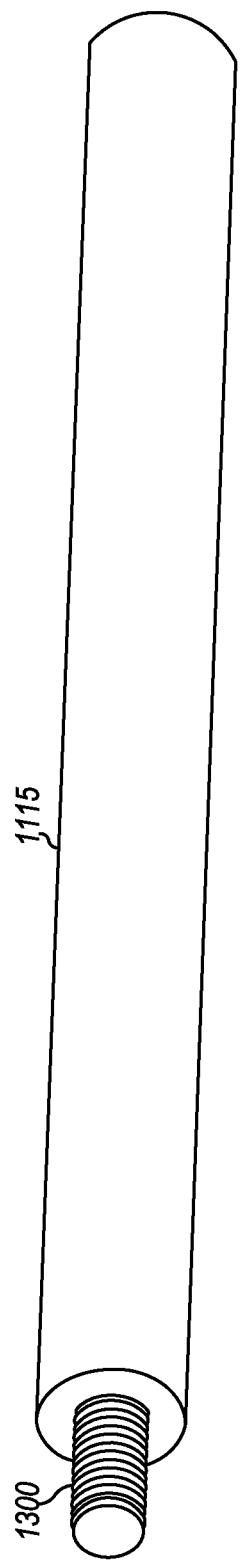
FIG. 13 is a perspective view of a leg to couple to the hub according to an example embodiment.

FIG. 13 is a perspective view of a leg 1115 to couple to the hub 1110. The leg 1115 has a peg 1300 extending from at least one end of the leg 1115 sized to mate with the radially extending openings 1220 in the hub 1110. Other means of attaching the legs to the hub, such as mating threads, snap fit, adhesive, friction fit, etc., may be provided in further embodiments. In still further embodiments, the hub and legs may be formed as a single integrated component.

In one embodiment, a waterproof electrical connection may be used for use in providing power to LEDs utilized to illuminate TiO2 coated surfaces through endcap opening illustrated at 510 in FIG. 5 and shown installed in a tube 210 in FIG. 7 in a sealed manner.

Figure 14:
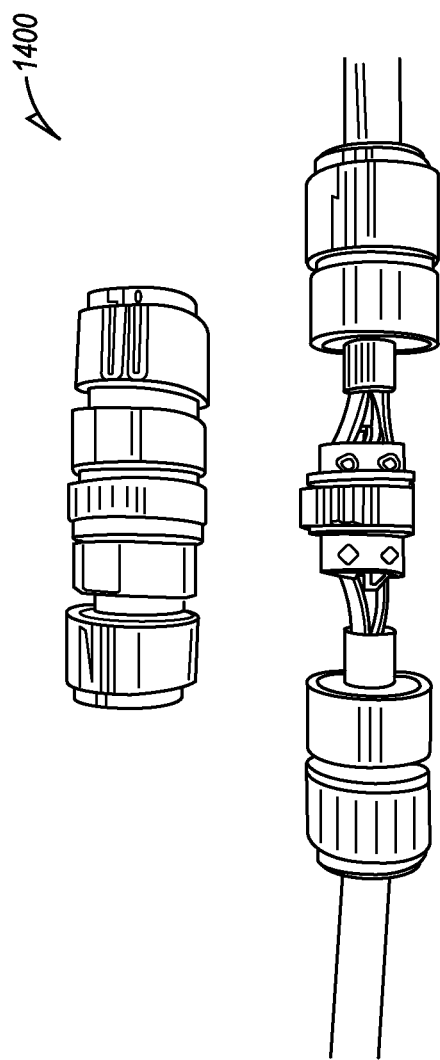
FIG. 14 illustrates connectors at that may be used to attached to an endcap according to an example embodiment.
Figure 15:
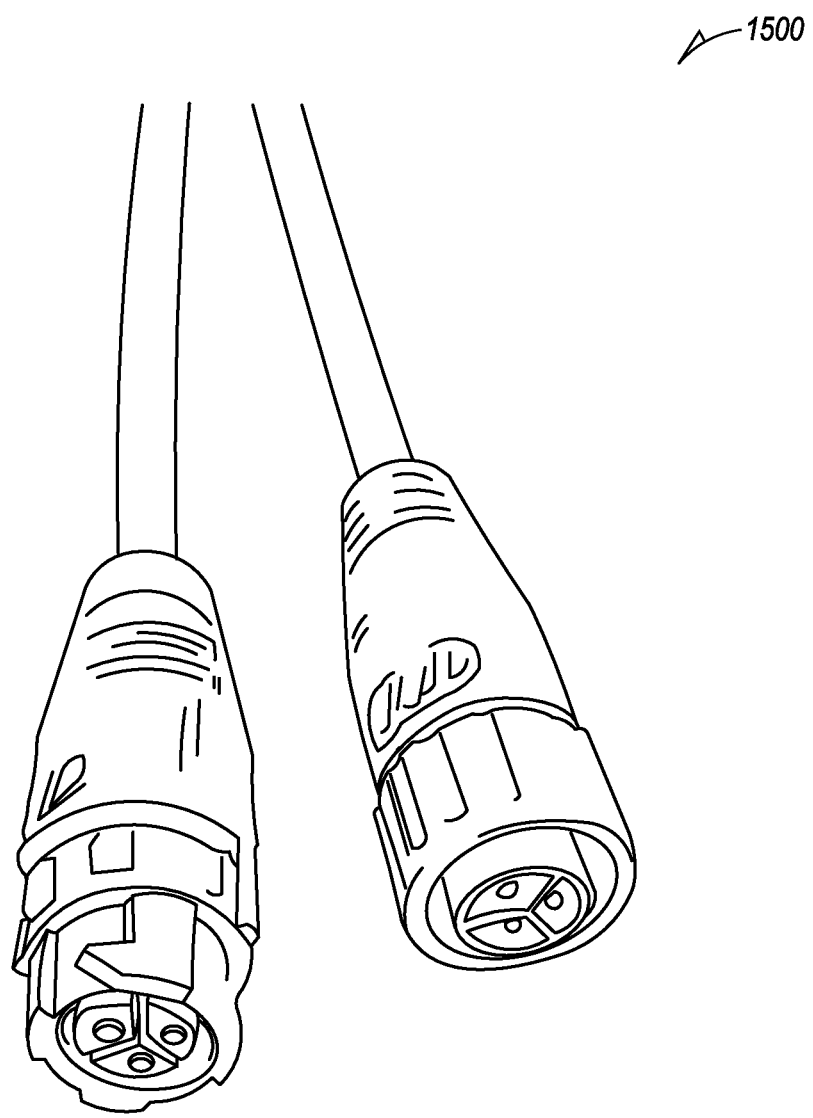
FIG. 15 illustrates connectors that may be used to attached to an endcap according to an example embodiment.

FIGS. 14 and 15 illustrate suitable available connectors at 1400 and 1500 respectively that may be used to attached to an endcap. Water proof wire connectors that may also be used to provide power to LEDs. The connectors and connection may be used to couple power cords from a safe electrical source, such as an above water electrical outlet, to the LEDs. A 24 or 12 volt AC or DC power supply may be coupled to the light sources, such as LEDs, which may be coupled in parallel. Power supplies having other voltages suitable for causing a light source to emit light to activate TiO2 coatings may be used in further embodiments.

The following paragraphs describe above water implementations of LED lights, light bulbs, and TiO2 coatings on various fixtures. The coatings of underwater structures and the light parameters described are also applicable to underwater coated fixtures.

In various embodiments, a light emitting diode light can produce light. One or more light emitting diodes may be encapsulated into a substrate, such as a circuit board. The light emitting diodes may emit light of a specific color (e.g., wavelength) or specific color temperature (e.g., hue). For example, a light emitting diode may be red, green, yellowish white (2,700 K color temperature), bluish white (5,700 K color temperature), or other colors or color temperatures.

In some embodiments, Photocatalytic Titanium Dioxide is added to a diffuser or other structure to provide multiple characteristics. The Photocatalytic Titanium Dioxide may be added to the material during formation of the diffuser and may also be added to an outside of the diffuser following diffuser formation. Photocatalytic Titanium Dioxide may operate as a catalyst on the outer light bulb shell made out of glass, Poly(methyl methacrylate) (PMMA), also known as acrylic or acrylic glass, or poly carbonate, but not to limited thereto. The outer light bulb shell may take many different shapes, such as bulbs, tubes, flat shapes, bell shape, cover, enclosing, encasing shapes and others as previously described with respect to fixtures designed to be placed underwater. Note that the fixtures may be placed around the LEDs, or may simply be placed near a source of light, such LEDs, lasers, or other sources of light. In some embodiments, the fixture may be placed as near as possible to the source of light or otherwise placed to ensure sufficient or optimal exposure of the TiO2 to the light.

In still further embodiments, Photocatalytic Titanium Dioxide may be added to fixtures holding the light emitting diodes. In portions of the fixture exposed to the emitted visible light in the 10 nm range or higher, the Photocatalytic Titanium Dioxide acts as a photo catalyst for degradation of organic molecule pollutants. In one embodiment, the Photocatalytic Titanium Dioxide may be in the form of nanoparticles or crystals, which may be formed by extracting TiO2 from peroxides and heating the particles to 250-260° C. The use of crystalline particles may both increase the surface area and hence photocatalytic efficiency of the Titanium dioxide and enable activation with visible light. The crystalline particles help keep the TiO2 in suspension with an even distribution. In one embodiment, the crystalline particles are on average, less than 20 nm in diameter.

Figure 16:
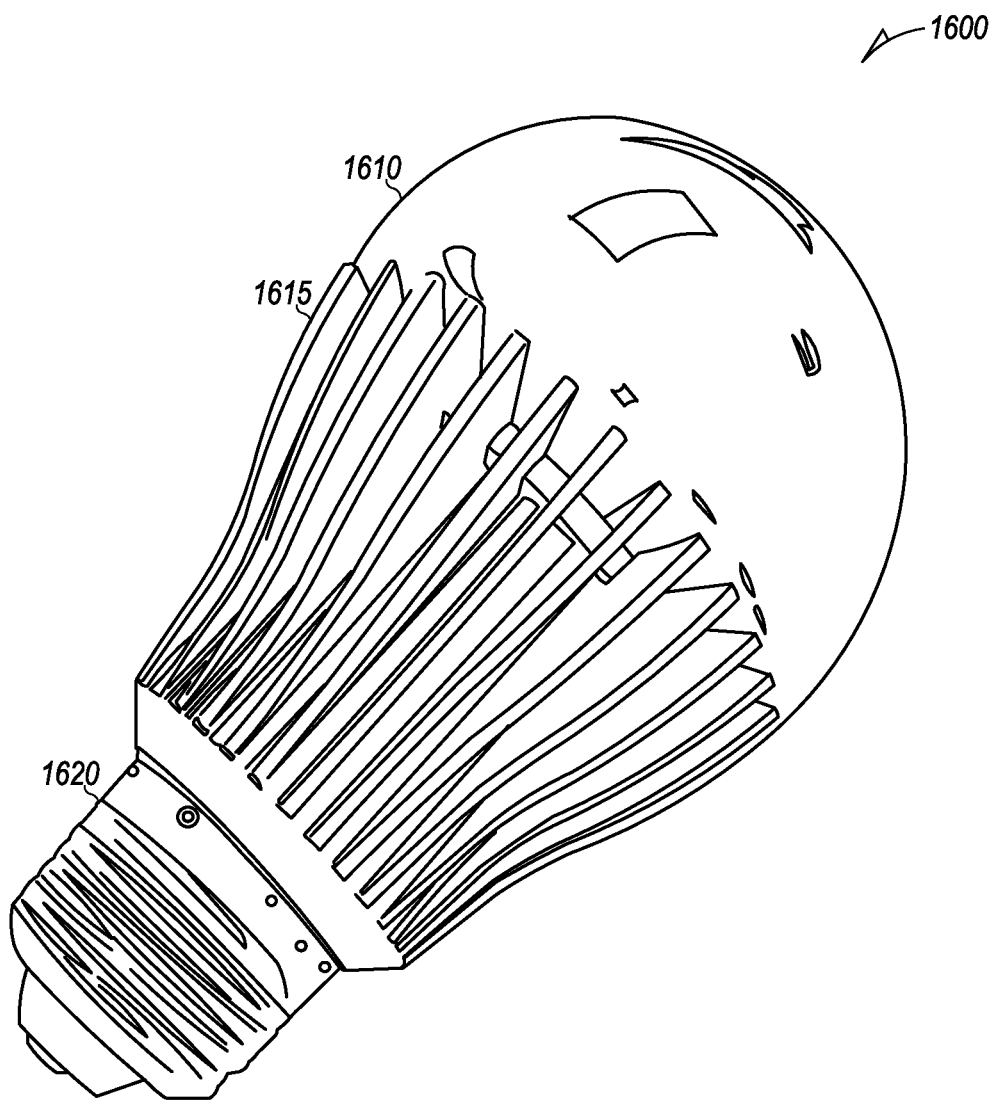
FIG. 16 is a perspective view of a further fixture that includes light emitting diode emitting light onto TiO2 coated surfaces according to an example embodiment.

FIG. 16 is a perspective view of a further embodiment of an assembled light emitting diode based light bulb according to an example embodiment. The assembled light bulb may include a dome 1610, a heat sink 1615, and an Edison-style connector 1620. In one example embodiment, the heat sink fins extend radially further from the top of the tube, and then taper down to extend a similar radius out from the tube as the radius of the electronics module, creating shape similar to that of a common incandescent light bulb. In one embodiment, the heat sink 1615 may be formed of glass or reflective metal. The planar glass surfaces between the fins may reflect light from the light emitting diode, further enhancing the number of lumen per watt. In one embodiment, the dome 1610 may be adapted to snap fit to and over the heat sink. In one embodiment, the heat sink and fins may be formed of glass to provide strength, heat conduction, and low thermal expansion.

In one embodiment, a lens, and/or fins may or may not be included in the light bulb. Dome 1610 in this embodiment, as seen in FIG. 16, operates as a diffuser and may include Photocatalytic Titanium Dioxide. The Photocatalytic Titanium Dioxide may be sprayed on to an exterior of dome 1610 in one embodiment. In another embodiment, the Photocatalytic Titanium Dioxide may be mixed into molten plastic or other material while forming the dome 1610. In further embodiments, the diffuser 1610 may have Photocatalytic Titanium dioxide sprayed, dipped or flowed onto or mixed into the diffuser. The dome may be made of GLASS, PMMA, POLYCARBONATE, ABS, or any polymer, that is transparent enough to let some light through.

Photocatalytic Titanium Dioxide, when exposed to UV or visual light will act as a catalyst to react with air to create a hydroxyl, OH, radical or hydroxy group (—OH) that attacks microbes, bacteria, viruses, allergens and pollutants, which are decomposed producing by products that are less harmful, such as water, and CO2. LED's emit a visual light photons in the 400-500+nm range. As such, the Photocatalytic Titanium Dioxide operates more efficiently as a photo catalyst to create OH, —OH, and O2 from ambient air as photons of visual light passes through the Titanium Dioxide. OH, —OH, and O2 may be lethal to bacteria, and other microbes, mold and organic pollutants. Ambient refers to an operating environment, which may be outdoors, indoors, in a controlled environment or other area where the LED based light bulb may operate that has suitable air contact for photocatalytic reaction which may occur when the light bulb is operating.

One or more dopants may be included in the Photocatalytic Titanium Dioxide, such as C, Cu, N, Sulfides and other metals and non-metals. In one embodiments, the Titanium Dioxide particles or crystals may be nano in size, which is 0.1 microns or smaller. Small nano particles, and crystals of photocatalytic Titanium Dioxide by volume have a larger surface area and are more efficient than larger particles as a photocatalyst. When sprayed on an outside, dipped, flowed on or infused into the bulb during manufacture of the bulb, nano particles, and crystals of Titanium Dioxide optimize the effectiveness of photocatalytic activity. The concentration of Titanium Dioxide particles may be adjusted based on the LED wattage, lumens produced, and other LED characteristics, and distance from the LED light source.

In one embodiment, the Titanium Dioxide may be formed in a peroxo titanic acid (PTA) solution by mixing titanic acid wet gel and hydrogen peroxide solution. The PTA solution may be a neutral, transparent, stable liquid that crystallizes to form an anatase phase after calcination at a temperature 250° C.-600 C in a crystalized form. When autoclaved at a temperature above 100° C. for 6 hours, the solution changes to a solution containing anatase crystals less than 20 nm in diameter. Aggregation of the crystals may occur after autoclaving at a temperature above 120° C. When heated to 100° C., the solution may be translucent and stable, containing anatase crystals approximate 9 nm in diameter.

Dip coating, spraying, flowing, over the LED diffuser and/or fixtures which will be proximate that LEDs in the solution may provide enhanced photocatalytic effect from light emitted in the visible spectrum, such as at least 400 nm to 500 nm or higher wavelength light. In further embodiments, a spray induction coupled plasma techniques, or a spray combustion flame technique may be used to form the coating. The solution sprayed may be derived from $TiCl_4$ solution and transformed to a neutral translucent solution containing peroxo-modified anatase crystals by heating. Other known or yet to be discovered methods of creating stable Titanium Dioxide particles or crystals that may be applied in various ways to diffusers and fixtures may be used in further embodiments.

In one embodiment, the Titanium Dioxide coating may be formed using a method described in U.S. Pat. No. 6,602,918 by producing a titanium dioxide-forming solution, wherein a hydrogen peroxide solution is added to a titanium-containing starting aqueous solution to form a peroxotitanium complex, a basic substance is then added to the peroxotitanium complex to obtain a solution which is in turn let stand or heated, thereby forming a precipitate of a peroxotitanium hydrate polymer, at least a dissolved component derived from the titanium-containing starting aqueous solution, except water, is then removed from the precipitate, and a hydroxide peroxide solution is finally allowed to act on a dissolved component-free precipitate. A dispersion with titanium dioxide may be dispersed therein to keep the Titanium Dioxide in suspension. The resulting nano sized crystalline structure may make the commercially available coating more photocatalytic such that the crystals stay in solution/suspension. In one embodiment, the solution is TPX 220 or TPX HL 220 available from Green Millennium in LA CA. These solutions have a higher parts-per-million of crystals than many other solutions, which appear to have a higher photocatalytic reaction rate than lower concentration solutions. Note that lower concentration solutions will also work, but may not work as well. The solutions may also be applied by water fall (pouring it over the surface). A surfactant may be added to the solution to act as a wetting agent reduce surface tension allowing the coating to be uniform and avoid puddling.

One example method of producing the titanium dioxide includes:

A 30% solution of hydrogen peroxide (20 ml) was added to and stirred with a solution (500 ml) of a 60% aqueous solution of titanium tetrachloride (5 ml) diluted with distilled water to prepare a transparent, brown solution. Ammonia water (1:9) was added dropwise to the solution to regulate the pH of the solution to 7, thereby preparing a transparent, yellow solution. The obtained solution was let stand at 25° C. for a whole day and night to obtain yellow precipitates.

Distilled water was added to the precipitates after filtered and washed to prepare a solution (about 150 ml), and a cation exchange resin and an anion exchange resin, each in an amount of 25 g, were charged into the solution, which was then let stand for 30 minutes for removal of cationic and anionic substances.

An $H^+$ substituted type resin obtained by treating Amberite IR120B ($Na^+$ substituted type, and made by Organo Co., Ltd.) with 2N hydrochloric acid for 1 hour was used for the cation ion exchange resin, and an $OH^-$ substituted type resin obtained by treating Amberite IRA410 ($Cl^-$ substituted type, and made by Organo Co., Ltd.) with IN sodium hydroxide for 1 hour was used for the anion exchange resin.

Powders obtained by drying the resultant yellow precipitates at 25° C. were measured with an X-ray diffactometer (RAD-B made by Rigaku Denki Co., Ltd.) using a copper target while it was operated at an acceleration voltage of 30 kV and with a current of 15 mA. The obtained precipitates were found to be in an amorphous state.

On the other hand, the powders obtained by drying at 25° C. were mixed with potassium bromide to prepare a tablet. According to the potassium bromide tablet method, the tablet was then measured using a Fourier transform infrared absorption spectrometer (FT/IR-5300 made by Nippon Bunko Co., Ltd.) in combination with a transmission technique. Absorption was found in the vicinity of 900 $cm^{-1}$, indicating the presence of peroxo groups.

Then, the ion exchange resins were removed by filtration, and distilled water was added to prepare a solution (about 180 ml), which was in turn cooled with ice water. Thereafter, a 30% solution of hydrogen peroxide (20 ml) was added to the solution, followed by cooling. After the lapse of 1 hour, a transparent, yellow solution (200 ml) containing titanium was obtained.

After a one-month or longer storage in a refrigerator at 7° C., the solution remained unchanged. Five days after preparation, the pH of the transparent, yellow solution was 5.1. Powders obtained by drying this solution at normal temperature, too, were similarly measured by X-ray diffraction. From the results of X-ray diffraction, it was found that the powders were in a noncrystalline state having no peak indicative of crystallinity. Results of a Fourier transform infrared spectroscopy resulted in absorption being found in the vicinity of 900 $cm^{-1}$, indicating the presence of a number of peroxo groups.

In one embodiment, prior to applying the Titanium dioxide coating, a protection layer may be applied to a diffuser. A fast-drying flat clear lacquer (such as Colormaster® flat crystal clear from Kyrylon, Inc) may be applied to the diffuser, or equivalent. The lacquer, which may be sprayed on the diffuser, may improve adhesion of the Titanium Dioxide coating. In one embodiment, the lacquer is applied to a plastic bulb exterior and/or interior in an even coating and may be sprayed. Applying the Titanium Dioxide directly to a plastic bulb may cause premature degradation of the plastic. A flat lacquer dries fast, which can improve manufacturing time by not having to wait as long for the protective coating to dry prior to applying the Titanium dioxide containing solution. The flat lacquer identified above is stated to dry within 10 minutes of spraying but the drying time may be reduced with increased heat and airflow to a minute or less. Other materials that may be used for a protection layer include acetones, toluene, and polypropylene. Still other protection layer materials may be used that protect the diffuser/bulb from degrading.

If air can pass through the diffuser, the Titanium Dioxide coating and optional lacquer coating, may be applied to the inside of the diffuser in addition to or alternatively to coating the outside of the diffuser.

In a further embodiment, a visible organic material may be applied to the coated diffuser to demonstrate the photocatalytic operation of the coating. India ink may be used in one embodiment and may be applied as visible spot on the diffuser. Any visible color of ink may be used, such as red, black, blue, or other color. With the coated bulb producing light, an observer can watch as the visible spot disappears. The spot may also take the shape of a design, such as a logo, or letters, or even the shape of a magnified bacteria.

In some embodiments, a coarse filter material may be coated with TiO2 and used in water to reduce zebra mussel populations. The coated filter material may serve as the fixture for use in removing zebra mussel larvae. The filter material provides a large surface area for activation within a given volume. A pump may be positioned to force water past and through the filter to speed removal bacteria and microorganism. In some embodiments, water within a container may be vibrated to cause eddy currents around the coated filter to speed removal.

Figure 17:
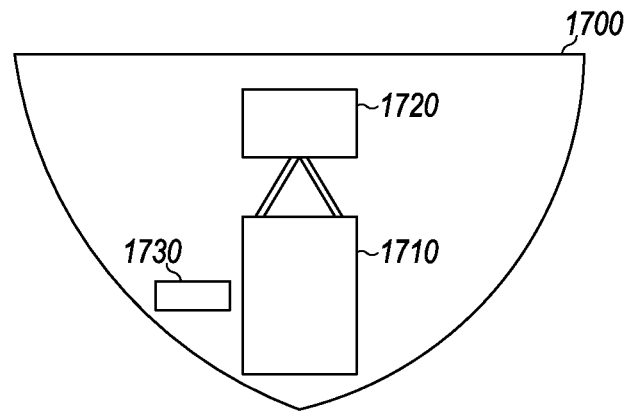
FIG. 17 is a block diagram of a container with a TiO2 coated filter according to an example embodiment.

FIG. 17 is a block diagram of a container 1700 such as ballast of a ship. In one embodiment, coated filter material 1710 is supported or otherwise disposed within the container 1700. A light source 1720 is positioned to provide light to the coated filter material 1710. In the case of a ballast of a ship, the engines of the ship and the movement of the ship via waves, turning, acceleration, deceleration, and other movement causes the fluid within the ballast to move past and through the coated filter, causing faster removal. In some embodiments, a pump 1730 may be added to cause movement of the fluid within the container 1700, also speeding removal. The pump may direct flow at the filter or be placed anywhere to cause movement of the water within the container. In some embodiments, water may be pumped into the container 1700, treated for 48 hours or so via the illuminated coated filter with water movement, and then pumped out.

In one embodiment, filter material 1710 is a filter pad for use in water falls, such as that available from Tetra Holding, Inc as RFWF1000. The filter material comes in 1-inch thick fiber mats that provide very little resistance to water flow through them. Other filter materials that provide a high surface area with little resistance may be used in further embodiments. The filter may be coated with TiO2 by dipping the filter into a solution as described above and drying the filter. The drying may be aided by using heated air.

Figure 18:
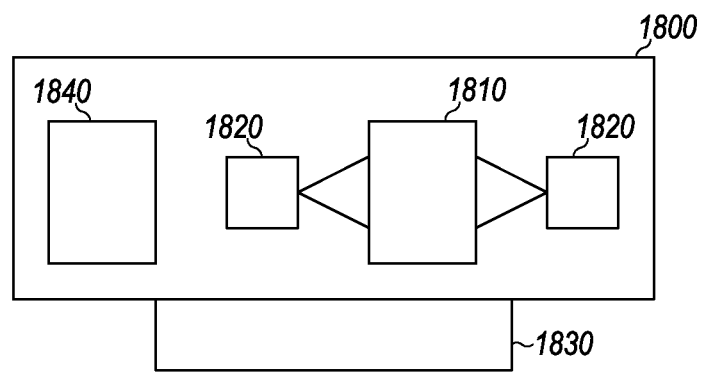
FIG. 18 is a block diagram of an alternative container with a TiO2 coated filter and vibrator according to an example embodiment.

FIG. 18 is a block diagram of a container 1800. The container may be a jar, bucket, ballast of a ship, tank, or other container that can hold a fluid, such a water that may contain bacteria and microorganism. A coated filter material 1810 is disposed within the container and a light source or sources 1820 are supported to illuminate the coated filter 1810 with light configured to activate the TiO2 coating on the filter material.

A vibration device 1830 may be positioned to vibrate the container 1800 to cause eddy currents or other movement of the water to expose more water to the coating on the filter material. A ¼" 2.0 amp. Makita sheet finishing sander may be used as the vibration device 1830. In some tests, a rheostat was used to slow the sander down by decreasing an input voltage from 120V to about 42V for use with a five-gallon pail as the container 1800. This greatly reduce noise but is not necessary. Many other means of vibrating the container may be used, including concrete industry vibration tools. While any amount of vibration may increase efficiency at removing bacteria and microorganisms, the size of the vibration tool may vary with the size of the container used. In a further embodiment, the water itself may be vibrated via a vibration tool 1840 which may be submerged or otherwise placed in contact with the fluid in the container.

In still further embodiments, pumps and vibrators may be used in open water environments to increase the efficiency of coated filter material placed in such open water environments with corresponding suitable light sources.

Figure 19:
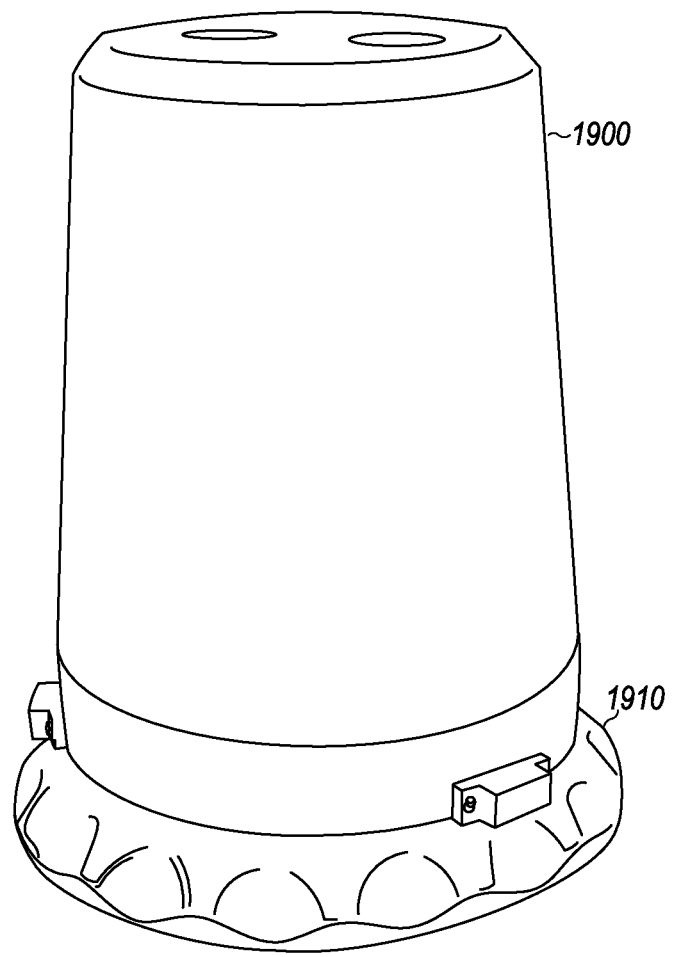
FIG. 19 is a representation of an image of a free-standing fixture according to an example embodiment.

FIG. 19 is a representation of an image of a free-standing device 1900 according to an example embodiment. Device 1900 includes a TiO2 coated dome in one embodiment that is supported by a weighted base 1910. The weighted base 1910 makes the device 1900 heavier than water, allowing the device to remain submerged. A light source is disposed within the dome and is supported by the base or otherwise in one embodiment to provide suitable light to activate the TiO2 coated external surface of the dome. A battery or other power source may also be disposed within the dome. In further embodiments, an electrical connector may be included for receiving power from an external power source via a cord suitable for underwater use.

Figure 20:
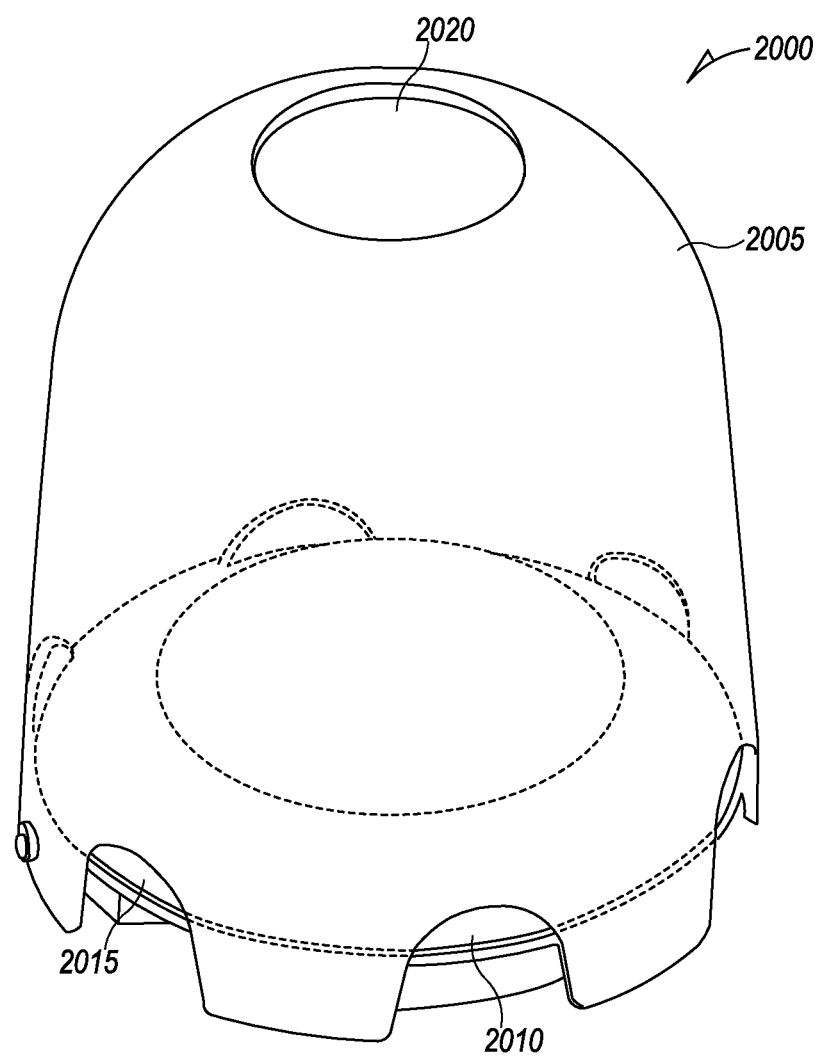
FIG. 20 is a representation of an image of an alternative free-standing device according to an example embodiment.

FIG. 20 is a representation of an image of an alternative free-standing device 2000 according to an example embodiment. Device 2000 includes a TiO2 coated fixture or dome 2005 in one embodiment that is supported by a weighted base 2010. The dome 2005 maybe coated on an inside of the dome, and outside of the dome, or both. The dome 2005 includes openings 2015 proximate the base 2010 to allow water to enter the inside of the dome and may also include a top opening 2020 to allow circulation of water through the dome between the various openings. A light source is disposed within the dome 2005 and is supported by the base 2010 or otherwise in one embodiment to provide suitable light to activate the TiO2 coated internal and/or external surface of the dome. A battery or other power source may also be disposed within the dome. In further embodiments, an electrical connector may be included for receiving power from an external power source via a cord suitable for underwater use.

Figure 21:
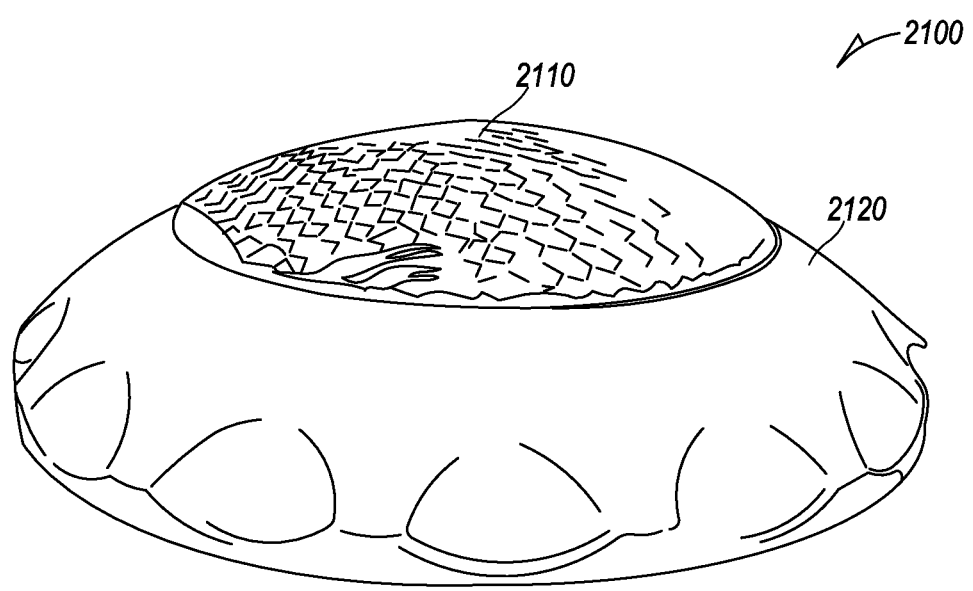
FIG. 21 is a representation of an image of a further alternative free-standing device that has a low profile

FIG. 21 is a representation of an image of a further alternative free-standing device 2100 that has a low profile. Device 2100 includes a disk-shaped fixture or dome 2110 that may be formed like a spotlight dome for projecting beams of light. The dome 2110 may be TiO2 coated in one embodiment and is supported by a weighted base 2120. The base 2120 may be formed of rubber, to provide sufficient weight to submerge the fixture 2100 in water. A light source is disposed within the dome and is supported by the base or otherwise in one embodiment to provide suitable light to activate the TiO2 coated external surface of the dome and to illuminate other TiO2 coated surfaces within a path of light emitted from the fixture. A battery or other power source may also be disposed within the dome. In further embodiments, an electrical connector may be included for receiving power from an external power source via a cord suitable for underwater use.

Each of the underwater fixtures/devices may operate on 12 volts or 120 volts. For light sources exposed to water, such as in device 2100, the light source may be operated at a lower voltage, such as 12 volts.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method of suppressing zebra mussel larva underwater invasive species comprising:
    coating at least a portion of a fixture with photocatalytic titanium dioxide (TiO2), wherein the fixture comprises a luminaire coated with photocatalytic TiO2 on an inside and an outside the luminaire; and
    placing the luminaire underwater in a position in which at least a portion of the coated outside of the luminaire is exposed to light such that the photocatalytic TiO2 coating is activated, wherein exposing the coated outside of the luminaire to light is provided by a light source positioned to emit light away from the coated outside of the luminaire to attract zebra mussel larva and to direct light towards the coated outside of the luminaire to generate O2 to destroy the attracted zebra mussel larva.

2. The method of claim 1 wherein the luminaire is translucent or transparent and comprises a light source disposed within the luminaire to expose the TiO2 coated outside of the luminaire to light.

3. The method of claim 2 wherein the luminaire comprises dome.

4. The method of claim 3 wherein the dome incudes openings to permit water flow through the dome.

5. The method of claim 1 wherein the luminaire comprises a container.

* * * * *